United States Patent [19]

Segal

[11] 4,044,188
[45] Aug. 23, 1977

[54] STAMPABLE THERMOPLASTIC SHEET REINFORCED WITH MULTILENGTH FIBER

[75] Inventor: Leon Segal, Randolph, N.J.

[73] Assignee: Allied Chemical Corporation, Morris Township, N.J.

[21] Appl. No.: 564,019

[22] Filed: Apr. 1, 1975

Related U.S. Application Data

[63] Continuation-in-part of Ser. No. 293,975, Oct. 2, 1972, abandoned.

[51] Int. Cl.² .............................................. B32B 5/16
[52] U.S. Cl. ................................. 428/283; 156/62.2; 156/244; 264/88; 264/108; 264/332; 264/257; 264/258; 264/331; 428/284; 428/288; 428/292; 428/293; 428/294; 428/295; 428/297; 428/298; 428/302; 428/323; 428/409; 428/285
[58] Field of Search .............. 428/284, 283, 288, 285, 428/292, 293, 294, 295, 297, 298, 302, 409, 323; 264/88, 108, 332, 257, 258, 331, DIG. 19, DIG. 53, DIG. 57, DIG. 61; 156/62.2, 244

[56] References Cited

U.S. PATENT DOCUMENTS

| 3,121,656 | 2/1964 | Gluck | 428/283 |
| 3,616,196 | 10/1971 | Sun | 428/302 |
| 3,684,645 | 8/1972 | Temple | 428/293 |
| 3,709,773 | 1/1973 | Hall | 428/295 |
| 3,713,962 | 1/1973 | Ackley | 428/302 |
| 3,770,562 | 11/1973 | Newman | 428/302 |

*Primary Examiner*—Marion E. McCamish
*Attorney, Agent, or Firm*—Roger H. Criss; P. Henry

[57] ABSTRACT

Reinforced thermoplastic polymer composite sheets are formable into smooth, shaped objects in a rapid stamping process in a cool mold when pre-heated outside of the mold. The characterizing constituents of the composite sheet are: (1) thermoplastic resin, (2) relatively short reinforcing fibers, (3) relatively long or continuous glass fiber, and (4) a particulate loading agent. This four-component system, laminated together, produces sheets having excellent formability, mechanical properties, uniformity and in particular surface smoothness not heretofore obtainable, and are simple to fabricate continuously.

10 Claims, 9 Drawing Figures

FIG. 4
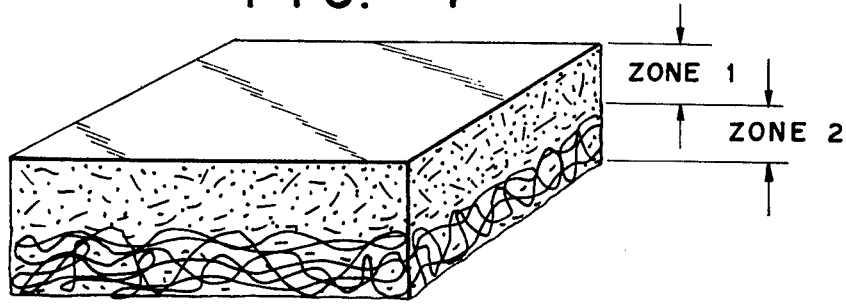
FIG. 5a (PRIOR ART COMPOSITION)
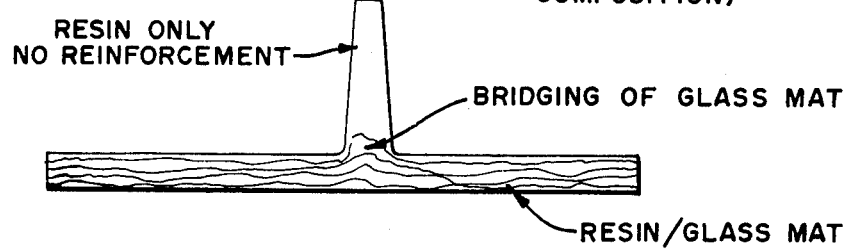
FIG. 5b (COMPOSITION OF PRESENT INVENTION)
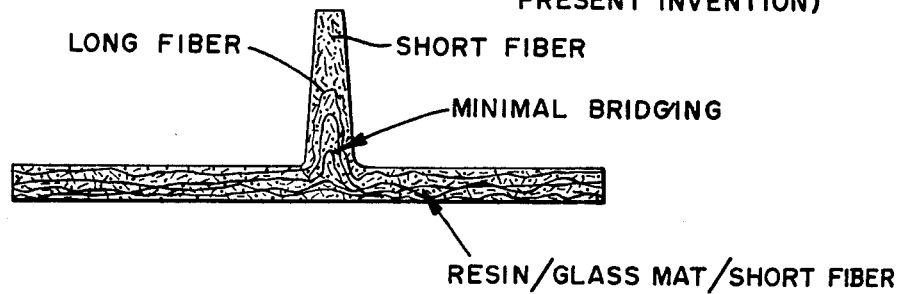

STAMPABLE THERMOPLASTIC SHEET REINFORCED WITH MULTILENGTH FIBER

CROSS-REFERENCE TO RELATED APPLICATIONS

This application is a continuation-in-part of application Ser. No. 293,975, filed Oct. 2, 1972, now abandoned.

BACKGROUND OF THE INVENTION

This invention relates to shaped thermoplastic articles. More particularly, this invention relates to a composite sheet consisting of: thermoplastic resin, short reinforcing fibers, long or continuous glass fibers, and a particulate loading agent which may be readily formed in conventional stamping apparatus into smooth surfaced, shaped objects. Shaping of the composite sheets may be effected by maintaining the shaping apparatus at temperatures between room temperature and 200° C. while preheating the sheet to a temperature above the softening point of the polymer. Under these operating conditions the total cycle time may be retained below about 30-40 seconds on even extremely large shaped parts.

It is known that many thermoplastic polymers can be formed into shaped objects at ambient temperatures by various sheet metal forming techniques such as deep drawing, stretch forming, stamping, forging, cold extrusion, etc. These cold forming processes are economically very attractive because it is possible to achieve rapid production rates, e.g., rates that exceed one item a second or even faster. Unfortunately, the thermoplastics prepared by such methods exhibit deficiencies in their properties, such as built-in strains and stresses, non-uniformity in wall thickness, tendency towards stress-cracking, poor dimensional stability, low modulus and strength, etc.

In order to overcome these deficiencies, processes such as those described in U.S. Pat. No. 3,621,092 and copending U.S. applications Ser. No. 195,450, filed on Jan. 11, 1971 and Ser. No. 268,400, filed on July 3, 1972 involving the rapid stamping of a glass fiber mat reinforced thermoplastic have been developed Generally in this process, a thermoplastic sheet, reinforced with a glass mat type of reinforcement is preheated in an oven to above the softening point of the resin. The heated blank is transferred to the matched dies of a stamping press, and stamped in a modified mechanical or rapid-closing hydraulic press, or the like. The formed part is then removed or ejected from the matched dies. The residence time in the mold is 20–80 seconds or less. The forming process can be separated into the following distinct stages.

1. Pre-heat of sheet or blank
2. Transfer to the rapid-stamping press
3. Stamping under pressure for a predetermined time
4. Removal or ejection from the press In stage 1, the composite sheet or blank is heated in a radiant, dielectric, infrared, convection, or vacuum oven or combination of ovens or similar heating source to a temperature above the melting point but below the decomposition point of the thermoplastic resin component of the blank.

In stage 2, the hot blank is transferred to a mold placed in a stamping press, wherein the mold or set of dies can impart the desired configuration of the final product to the sheet or blank. The mold is maintained at a temperature between room temperature (23° C.) and approximately 160° C. or more, depending on the polymer constituent of the sheet and upon the desired stamping characteristics.

In stage 3, the press is rapidly closed for a period of time sufficient to cause the blank to conform to the exact shape of the mold and to cool and/or crystallize sufficiently to allow part removal without distortion.

In stage 4, the molded article is removed from the mold.

It will be recognized that stamping parameters such as pressure requirements, residence time in the mold, pre-heat temperature, mold temperature, etc., are dependent upon the sheet composition, thickness, part complexity, etc. as described for example in the above mentioned U.S. patent applications Ser. Nos. 195,450 and 268,400.

A process of this kind has many advantages over conventional forming methods. (a) The cycle times are extremely fast, with a cycle time of 10–30 seconds per part often being realizable. (b) Standard sheet-metal stamping, hydraulic or mechanical stamping presses are usable, although slight modifications may be required in the clutch assembly in order to obtain the desired pressure cycle. (c) The shaped articles may have complex and non-planar configurations. (d) Variable thicknesses relative to the initial sheet or blank thickness can be achieved during stamping, or by "building up" the blank thickness prior to stamping. (e) Holes and notches can be formed during stamping or in post-forming operations.

Glass mat reinforced sheets of this kind as provided heretofore also suffer from certain disadvantages. Specifically the following deficiencies have been encountered in prior art compositions:

Surface Finish — Prior art compositions usually contain 30 to 60% by weight of glass mat. Such an amount is required in order to impart high mechanical strength properties, high modulus, and sheet integrity during the pre-heat and transfer stages of the rapid stamping cycle. During the pre-heat stage, the glass mat reinforced sheet is supported on thin rods, point-supports or in edge clamps, in order to allow equally thorough, rapid and uniform heating of both sides of the sheet. It will be apparent that the heated sheet, to permit it to be transferred to the stamping apparatus, must remain rigid and strong during this heating stage bearing in mind that temperatures in excess of the melting temperature are often needed to soften the interior of the thermoplastic sheet. Especially at the surface of the sheet, temperatures up to 20° C.–50° C. or more above the melt temperature are encountered, and the polymer becomes substantially fluid. The glass mat functions predominantly in retaining the integrity and strength of the sheet during the pre-heat stage. This function will be considered further hereinafter.

During the transfer stage, the hot or semi-molten thermoplastic sheet is transferred mechanically from the pre-heat oven or other heating environment to the stamping press. One method of transferring the hot thermoplastic sheet is by clamping the sheet along the edges and thus moving the clamped sheet to the stamping press. This method of sheet transfer does not interfere with or disrupt the integrity of the center of the heated sheet but it is essential that the sheet be strong enough during the transfer stage to support its own weight when clamped along the edges. An unreinforced sheet processed in this manner, for example, virtually disintegrates during the pre-heat and/or transfer stages because of insufficient integral strength in the melt when heated above the melting point. Moreover, even a sheet reinforced solely with short glass fibers, i.e., glass fiber ⅛–½ inch long or shorter, has insufficient strength to remain as an integral sheet during the pre-heat and transfer stages. Additionally for similar reasons, a thermoplastic resin sheet reinforced with an insufficient amount of glass mat will not remain intact during the pre-heat stage. For example, a thermoplastic resin sheet reinforced with only 5–20% of glass mat, when the resin is heated above its melting point, will drip and lose resin during the pre-heat stage, and may actually disintegrate into several non-associated sections during the transfer stage.

Thus, a substantial amount of glass mat is needed not only to yield good mechanical strength properties in the final stamped part, but also to retain sheet integrity during the preheat and transfer stages of the rapid stamping process. However, a high concentration of glass mat of the quantity needed to provide the necessary mechanical strength and to retain the integrity of the sheet when it is heated leads to a poor surface finish on the final, stamped part. For application such as automotive exterior parts (fenders, hoods), appliance housings, furniture components, etc., a perfectly smooth, imperfection free surface is mandatory. The measured depth of surface imperfections should be no more than 50–500 microinches ($10^{-6}$ inch) when measured using a standard Bendix Corp. Micro-corder, profilometer or similar stylus-type profile indicator.

A high concentration of glass mat near the surface of a stamped part ordinarily leads to imperfections larger than this limiting value. The cause for this is severalfold. First, glass fiber mats are not dispersed or filamentized into the thermoplastic resin matrix during the stamping cycle. This is to be distinguished from thermoplastic fabricating processes such as injection molding or extrusion, in which the glass fiber strands are broken up into the individual filaments and dispersed into the matrix. Since glass fiber strands normally consist of approximately 30–400 or more filaments per strand, and each individual filament is 0.0003 to 0.0008 inches in diameter, the breaking up and dispersion of these filaments is an important factor in obtaining smooth, fiber-free surfaces in injection molded or extruded objects. In stamping of glass fiber mat reinforced thermoplastics, however, extreme shear and mechanical working is not encountered. Rather, compressive stresses and mild, somewhat limited, translatory motion of the reinforced thermoplastic is encountered. This results in flow of the entire filament bundle (or strand) of glass fiber, rather than breaking up of the strand into the individual filaments. A bundle of glass fibers, or equivalently, a section of glass mat, embedded in the thermoplastic resin, leads to surface imperfection such as "hills and valleys" or "orange peel" effects, roughness, waviness, ripples, and in general, imperfections greater than 50–500, microinches in depth, as will be explained below. The higher the concentration of the reinforcing glass mat, the greater is the likelihood of occurrence of the detrimental surface imperfections. Thus, a primary cause of surface imperfections in stamped, glass mat reinforced thermoplastic sheets is the reinforcing glass mat itself.

Lack of Uniformity — Another deficiency encountered in stampable reinforced sheet compositions of the type with which the present invention is concerned is non-uniformity of properties in the finished stamped object. This non-uniformity is generally caused by two discrete factors. First, the composition of the glass mat reinforced sheet is homogeneous only on a macro-scale. On a micro-scale, the reinforced sheet is seen to consist of a web-like glass mat, with a separate resin phase forming a distinct region within the whole structure. This resin-rich region is necessarily mechanically weak because of the absence of reinforcing glass fibers. This distinct two-phase characteristic is not encountered in more conventional fabricating methods, such as injection molding, since, as described above, a more homogeneous glass fiber dispersion is obtained in the conventional processing techniques.

The second factor causing non-uniformity of properties is the flow of the resin during the stamping stage, especially flow over, or into, highly irregular corners, edges, ribs, bosses, inserts, and the like. Such flow often serves to separate the matrix resin and reinforcement phases of the composite, again leading to non-uniformity in composition and properties of the article. Separation of the glass fiber reinforcement from the matrix resin is often known as "bridging", and occurs when a molded section, attachments, or contour causes preferential flow and/or separation of the matrix or reinforcement. For example, in the molding or stamping of a part containing a thin raised section (see FIG. 8), the fibrous reinforcement will not readily flow into such a thin section since some fibers will naturally form a "bridge" or obstruction across the entrance to the thin section, resulting in preferential flow of resin into the section.

If the dimension of the thin section or entrance to such a section is large when compared to the length of the fibrous reinforcement, bridging will not occur. In the case of materials reinforced solely with very long or continuous fibers, bridging will be very pronounced since the fiber length is inherently large when compared to sections of a complex part. Thus, prior art compositions often suffer from significant non-uniformity of properties in all but extremely simple, or nearly-flat objects.

Lamination Processing — A desirable method of continuously producing the sheet compositions formable by the rapid stamping technique herein described is by a continuous extrusion/lamination scheme. Using such a method, two plies of thermoplastic sheeting are extruded or similarly produced; glass mat or its equivalent is then fed in between the two plies; the proper combination of heat and pressure (supplied by laminating rolls or the like) is then used to fuse and laminate the two sheets and the glass fiber web, mat, or the like together into an integral sheet construction.

If a high concentration of glass mat is needed in the composite sheet, as in the present invention, a continuous mode of fabrication presents significant practical difficulties. For example, at a glass mat concentration of 40% by weight, a thermoplastic sheet may require 3–6 ounces/ft$^2$ of glass mat. Such a weight of glass mat would have a thickness prior to compression or lamination of 0.100 inch to 0.200 inch. After compression and lamination, the total sheet thickness (i.e., two thermoplastic plies plus the central glass mat) would be in the range of 0.085 to 0.105 inch. It is clear that the large initial thickness of glass mat complicates the continuous lamination scheme, since compression and impregnation of a large thickness of glass fibers is difficult to accomplish thoroughly.

SUMMARY OF THE INVENTION

In accordance with the invention I have discovered a method of making thermoplastic sheet compositions which are reinforced with glass fibers of at least two different forms. These sheets have the advantage of relative ease of fabrication, can be readily formed in a stamping process and yield products of superior surface quality and mechanical properties. In particular the compositions of this invention yield products whose properties are uniform on a micro-scale because of improved dispersion of a major portion of the fibrous reinforcement phase. The compositions also possess more uniform properties in finished parts because of a decreased probability of glass fiber-resin separation or "bridging" across small holes, depressions, corners, radii, etc. The compositions herein described also possess a highly improved surface quality because of (a) the decreased glass mat content, (b) an increased "resin-phase" viscosity because of short fibrous and/or particulate additives, (c) the orientation of short fibers in the plane of the sheet and (d) the resultant reduced prominence of glass mat fiber strands at the surface of the sheet composition.

None of the desirable characteristics of the reinforced sheet compositions are impaired by the improvements herein described, and several characteristics are significantly improved.

It is an object of the present invention to provide a novel, multi-length glass fiber-filled composite sheet of thermoplastic polymers that may be shaped in a relatively cold mold.

It is another object of the invention to provide novel high strength sheets which are reinforced with a relatively low content of glass fiber mat in which the fiber length is 1½ inches to continuous, and in addition reinforced with short fiber reinforcement of length ½-¼ inch or lower.

It is a further object of the invention to provide novel sheets which are reinforced with an extremely low content of glass fiber mat in which the fiber length is 1½ inches to continuous, and in addition is reinforced or filled with short fiber and/or particulate filler loading agents.

It is still another object of the invention to provide a glass fiber reinforced sheet composition of highly improved surface quality and which possesses a smooth surface after being stamped into a shaped object without impairing any of the desirable characteristics of reinforced sheet compositions of this kind.

Another object of the invention is to provide sheet compositions of improved property uniformity, and of lowered probability of fiber-resin separation.

A further object of the invention is to provide laminated or unified sheet compositions containing random glass mat in which at least one surface is substantially free of reinforcing glass mat.

It is another and a specific object of the invention to provide a laminated sheet structure in which short reinforcing fibers are oriented randomly predominantly parallel to the plane of the entire sheet.

In accordance with this invention, there is provided a smooth surfaced thermoplastic composite sheet having an average surface roughness height under 500 microinches and comprising, in percent by weight of the total composite:

a. from about 25 to 65% of a synthetic thermoplastic resin,
b. from about 20 to 50% of a particulate filler,
c. from about 15 to 45% of short glass reinforcing fibers having a length not greater than 0.85 inch, at least 50% of said fibers being aligned substantially parallel to the plane of the sheet, and
d. from about 2 to 15% of long glass fibers having a length of about 1½ inches to continuous and being substantially below the exterior surface of the composite sheet.

Also in accordance with this invention, a process for producing a smooth surfaced thermoplastic composite sheet formable into smooth, shaped objects in a rapid stamping process in a cool mold when preheated outside of the mold, which comprises forming a surface layer of components (a), (b) and (c) and adhering thereto, with the thermoplastic resin as the binder, under heat and pressure, a substrate comprising a glass mat formed of component (d), whereby the long glass fibers are substantially below the exterior surface of the composite sheet.

BRIEF DESCRIPTION OF THE DRAWINGS

FIG. 4 illustrates another alternate in which the top surface is of a surface smooth grade but in which the bottom surface because of the contiguous presence on the surface of a multitude of glass mat reinforcing fibers, presents a relatively coarse surface.

FIGS. 5a and 5b are comparative schematic figures, illustrating the increased moldability and pronouncedly reduced glass fiber-resin separation obtained with the compositions which are the object of this invention; that of FIG. 5b made according to the invention is compared to conventional prior art compositions.

DESCRIPTION OF THE PREFERRED EMBODIMENTS

Figure 1:
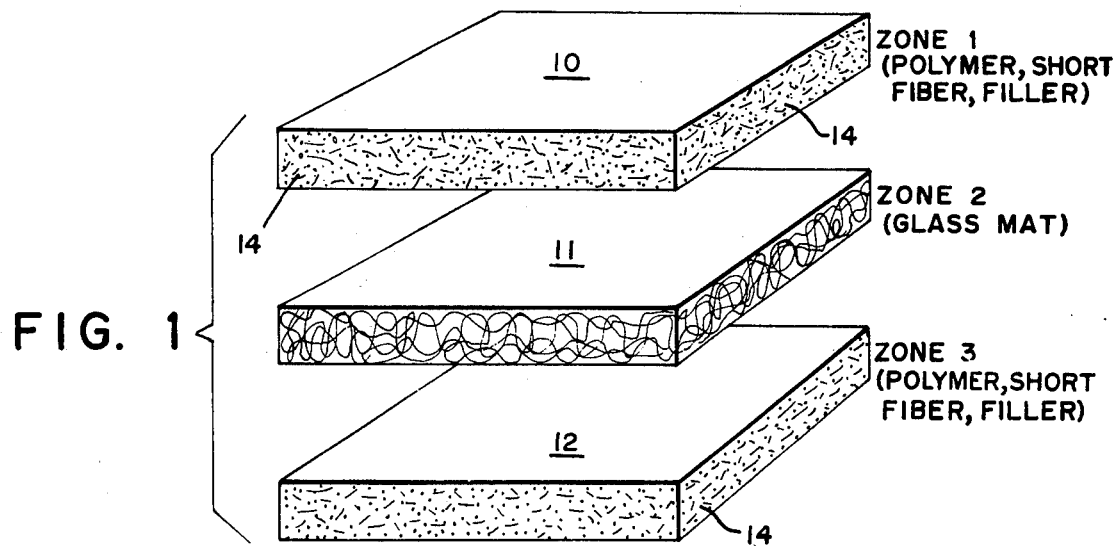
FIG. 1 illustrates schematically the three laminates of a four-component surface smooth grade, sheet composition prior to lamination or fabrication into the stampable sheet product.

In accordance with the invention, exceptionally good shaped products may be obtained from composite reinforced thermoplastic sheets having two discrete and distinct lengths, modes, and concentrations of glass fiber reinforcement and constructed in the manner herein specified. The reinforced sheet compositions of the present invention show improved property and surface quality characteristics.

The prime characteristic of the present invention which results in a smooth surfaced, stampable composite sheet is the unique sheet construction. The composite sheet is composed essentially of one or more smooth surface layers which contains predominantly resin, short well dispersed randomly planar fibers, and particulate filler, and of another layer, core, section, or zone which contains the above 3 components plus glass mat reinforcement. The layer containing the glass mat reinforcement is substantially below the exterior surface of the composite sheet, as exposure or prominence of the glass mat reinforcement near the surface of the sheet results in a non-smooth surface exhibiting defects such as waviness, orange peel effects, fiber pattern showthrough and fiber fisibility. The defect-free surface is essentially a resin-phase rich layer, absent of glass mat but reinforced with short dispersed fibers and/or filler.

The stampable composite sheet may have one or two defect-free surfaces, as shown in the attached drawings.

In both FIGS. 2 and 3 of the drawings (the following reference numerals referring to the laminate precursor shown in FIG. 1), the glass mat region (zone 2) or laminate 11 containing random, undispersed glass fiber strands or bundles is kept well below the chosen surface of the sheet. The surface layer(s) (zones 1 and 3) contains only resin, particulate filler, and dispersed, filamentized short fibers. The fibers comprising Zone 2 are kept away from the surface during stamping of the sheet by the increased resin-phase viscosity (i.e., the melt viscosity of the phases of zones 1 and 3). In addition, the short well dispersed fibers 14 are randomly but predominantly two-dimensionally oriented in the plane of the sheets 10 and 12. That is, more than 50% of the fibers are aligned substantially parallel to the plane of the sheet. Such orientation of the short fibers is easily achieved in extrusion, rolling, drawing or similar orientation-inducing processes, and is preferable for purposes of this invention in achieving smooth-surfaced sheets.

The surfaces of the stamped composite sheets, and of the sheets prior to stamping, have a roughness approaching the roughness of injection molded, thermoplastic articles, or substantially smoother. As measured by a Bendix Micro-corder, composite sheets as described herein possess surface roughness values no greater than 500 × 10$^{-6}$ inches (500 microinches). The low surface roughness of these sheets is due to the absence of detrimental glass mat reinforcement near the sheet surfaces.

In general, it is desirable to have the glass mat reinforcement at least 0.4 to 20 mils below the sheet surface prior to stamping, and no closer than 0.2 mils below the sheet surface after stamping, although some variations from these figures may be allowable, depending on exact sheet composition, stamping conditions, part configuration, etc. The further the glass mat reinforcement from the sheet surface, the smoother will be the final sheet surface.

The thermoplastic polymers which can be used in forming the sheet compositions which may be stamped into shaped objects in accordance with the methods of the present invention include the various thermoplastic materials normally used in injection molding, extrusion, vacuum forming, blow molding, fiber spinning, or similar thermoplastic processing techniques.

Suitable thermoplastic resinous materials which may be utilized in making the composite laminate of the invention include, for example, the alkenyl aromatic resins typified by polystyrene, styrene copolymers, blends and graft copolymers of styrene and rubber and the like. The invention may be practiced utilizing polyvinylchloride or vinylidene chloride copolymers (sarans).

Particularly desirable thermoplastics in such compositions are the polyamides; that is, polymers having regularly recurring amide groups as an integral part of the main chain. Polyamides such as nylon 66 (a condensation produce of hexamethylene diamine and adipic acid) and nylon 6 (the polymerization produce of ε-aminocaproic acid or caprolactam) are examples of two polyamides or nylons.

Polyolefins may also be employed, including polyethylene, polypropylene, polymethylpentene, and copolymers thereof.

Additional polymers which can be utilized include polyurethane resins; polysulfone resins; polycarbonate resins and linear polyester resins such as polyethylene terephthalate and polybutylene terephthalate; cellulose ester resins such as cellulose nitrate, cellulose acetate, and cellulose propionate; halogenated olefins and polyacetal resins.

Also included in the term "polymer" are blends of two or more polymeric materials. Illustrative of such blends are polyethylene/polypropylene, ethylene-acrylic acid-vinylacetate terpolymers, and the like.

The glass fiber used in making the fiber mat is preferably used in the form of glass fibers or strands or bundles which are at least about 1½ inch to continuous in length. The glass may be used in the form of filament, strand, thread, yarn, roving, non-woven, scrim, and the like. The strands or fiber comprising the reinforcing mat are held together either by resinous adhesive binders (thermosetting or thermoplastic resins) or by "needling" or by the mechanical interaction of the randomly patterned web-like structure.

The individual glass strands are comprised of about 2 to 400, preferably 5–120, filaments per strand. Each filament is about 0.00030 to about 0.001 inch, preferably 0.00035 to 0.00085 inch in diameter. The glass mat comprising the reinforcing phase may have a weight of from 0.3 to 10 ounces per square foot. It is clear that the less filaments/strand in the reinforcing mat, the smoother will be the surface of the sheet, since more space for complete disbursement is available and therefore large collections of fibers will not be present.

Glass mat is readily distinguishable from other forms of fibrous reinforcement because of the random, weblike, or swirl arrangement of the fibers, and should, therefore, not be confused with woven types of reinforcement such as glass cloth, woven roving, woven scrim, and the like. Glass mat is also readily distinguishable from the short chopped fiber reinforcement which comprises a third discrete and critical phase of the composite sheet. The filamentary reinforcement of the third phase is most beneficial in mean lengths from about 0.01 inch to 0.85 inch, in the final product, preferably from 0.015 to 0.75 inch in mean length.

These short lengths of fibrous reinforcement are often obtained because of the characteristics of the processing apparatus used to compound or blend this reinforcement with the thermoplastic resin. For example, if fibers ½ inch or longer are placed in the feed hopper of a single screw extruder along with the resin, the fibers will ordinarily be broken down into lengths shorter than the original ½ inch starting length because of abrasion, shear, turbulence, and mechanical work performed upon the fibers. Longer lengths (i.e., mean lengths longer than 0.010–0.750 in a major portion of the short fiber reinforcement) may be retained by minimizing the amount of shear or mechanical break-down of fiber length, with some sacrifice in homogeneity or prolonged processing times although lengths greater than ⅜ inch are not desirable for the object of this invention. Another processing machine which may be used to blend and/or manufacture the short-fiber filled resinous sheet is a twin screw extruder. In this case, the filamentary reinforcing material may be added to the nip of agitating heat plastified polymer between the screws through a feed port such as a volatile (vent) port. In the latter case, the filamentary reinforcing material may be fed to the twin screw extruder in the form of yarn or roving, and the short fiber lengths would be obtained by the mechanical break-up performed by the mixing action of the screws.

Glass fibers as normally used for reinforcement of thermoplastics may be treated or coated with a sizing composition. Standard sizing agents usually consist of several components, each of which possesses a distinct function. For example, a binder or film former gives the glass fiber strand integrity for workability and prevents fuzzing and aids in distribution of the sizing agent; a lubricant prevents destruction of the strand by abrasion of the individual filaments against each other and against fiber handling equipment; a coupling agent assists in obtaining greater adhesion between the glass fibers and the polymeric resin yielding improved strength characteristics; an emulsifying or dispersing agent allows sufficient dissolution of the various ingredients in the required carrying agent (frequently water) and improves compatibility between the various ingredients. In addition, pH adjusters, antistatic agents, wetting agents and surfactants are also often added to sizing formulations. Ordinarily, organosilicon compounds may suitably be employed as coupling agents. For example, halogenated or non-halogenated vinyl and alkyl containing, alkylalkoxy, alkenyl, aminoalkyl, aminoalkoxy, acyloxy, alkenyl acyloxy and similar silanes, their hydrolysis products and polymers of the hydrolysis products are suitable for such use. Formulations of this kind and methods of use are known to those skilled in the art.

The fourth constituent of the improved thermoplastic sheet material herein described is particulate filler. Such fillers may be selected from a wide variety of minerals, metals, metal oxides, siliceous materials, metal salts, and mixtures thereof. These fillers may optionally be treated with various coupling agents or adhesion promoters, as is known to those skilled in the art. Advantageous physical properties are achieved if the filler material has a Young's modulus of $10^7$ psi or greater and at least a Young's modulus twice as great as that of the polyamide. Examples of fillers included in these categories are alumina, aluminum hydrates, feldspar, asbestos, talc, calcium carbonates, clay, carbon black, quartz, novaculite and other forms of silica, kaolinite, bentonite, garnet, mica, saponite, beidellite, calcium oxide, calcium hydroxide, etc. The foregoing recited fillers are illustrative only and are not meant to limit the scope of fillers that can be utilized in this invention. Adhesion promoting agents or coupling agents, may, of course, also be utilized on the particulate filler phase.

The particulate filler may be added to the molten thermoplastic resin before, during or after the addition of the short glass fibers to the resin. Thus, for example, filler and resin pellets may be fed to the feed hopper of a single screw extruder; the mixture is blended and conveyed towards the die. Short glass fibers can be added to the molten mixture at a vent-hole or other such opening down stream of the feed hopper, and the mixture then extruded into pellets, or preferably, directly into sheet of the appropriate thickness for lamination with the glass mat reinforcement. In the extrusion process, the short fibers will emerge oriented randomly in the plane of the extruded sheet.

FIG. 1 presents 3 sections of a surface grade, laminated structure in which both zone 1 and zone 3 have been produced by extrusion of a three-component mixture (polymer, glass fiber, particulate filler) from a standard sheet extrusion die. Zones 1 and 3, or their equivalents, are then combined with zone 2 (the glass mat reinforcement) by conventional laminating or impregnating techniques such as compression molding, extrusion, calendaring, extrusion coating, adhesive lamination, or the like. Other standard impregnation techniques, such as dip coating, powder impregnation, and knife coating may also be utilized to prepare a resin matrix, glass mat core type of material. The proper temperature and pressures known to those skilled in the art are readily utilized to achieve impregnation of the reinforcing mat. The processing times to achieve a unified laminated construction will vary according to the pressure, temperature, thermoplastic resin characteristics, amount of fiber and filler present, the amount of glass mat present, and other material and processing parameters. During impregnation or lamination under pressure and heat, the short dispersed fibers parallel to the plane of the mat or sheet resist motion perpendicularly into the mat, and thus serve to keep the mat away from the surface of the composite sheet.

The proportions and relative amounts of each of the short and long glass fiber phases is critical in achieving the stated objectives of the present invention. The thermoplastic resin generally comprises from 25 to 65% by weight of the total composite, preferably 30 to 50%. The particulate filler is preferably present in amounts from 20 to 50% by weight of the total composite and most desirably in amounts from 25 to 40%. The short fiber reinforcement should comprise from 15 to 45% by weight of the total, preferably from 20 to 30%. The long-to-continuous fiber reinforcing mat must comprise not more than about 15% by weight, preferably not more than about 10% by weight of the total composite nor less than 2%, or detrimental effects upon the surface quality, processability in stamping, and properties of the composite sheet will be observed. Other minor additives which may be of value in sheet formulations include antistatic agents, plasticizers, lubricants, heat and light stabilizers, or other similar processing aids and adjuvants.

Each of these four primary constituents performs a specific function within the composite material. The thermoplastic resin is, of course, the matrix which binds the other constituents together. As the matrix, the resin influences the mechanical and physical properties of the composite sheet. If a stamped product having an extremely high thermal resistance is required, for example, a nylon or linear polyester would be utilized as the matrix rather than polyethylene or polypropylene. If an extremely high impact resistance was required, for example, an impact resistance styrene copolymer or polycarbonate may be used rather than polystyrene or a more brittle linear polyester.

While composites without filler may be formed, the most desirable sheets include filler.

The functions of the particulate filler are: (1) to increase the modulus and stiffness of the composite sheet, (2) to provide a more economical composition, and (3)

to increase the resin-phase melt viscosity. The reasons behind the first two factors are self-evident. The high resin-phase melt viscosity is necessary in order to avoid migration of the glass mat reinforcement to the surface of the sheet during sheet fabrication or stamping, since such a migration or glass mat proximity to the surface results in extremely poor surface smoothness qualities.

The functions of the short fiber reinforcement are: (1) to increase the sheet stiffness and mechanical strength (2) to increase the resin-phase melt viscosity and (3) to compensate for the low content of the relatively long glass mat reinforcement, (4) to allow flow of the mixture into small holes, apertures, etc. during stamping and (5) to yield an improved surface in which most short, dispersed fibers are oriented and lie in the plane of the sheet. The reasons for factors (1) and (2) above have been explained above. The low glass mat content is a mandatory requirement necessary for the improvement of surface smoothness. It has been shown that a high glass mat content (i.e., 20–40% or higher) does not allow for a smooth surface, since it is not possible to keep such an amount of glass mat within a well defined or centralized zone. The enhanced flow into small openings, bosses, ribs, etc., avoids fiber-resin separation, property non-uniformity due to bridging, and improved formability of complex stamped parts. The effect of minimal bridging due to the presence of short fiber is imperative and distinguishes the compositions of the present invention from prior-art compositions. In addition to the ability to form relatively narrow ribs, bosses, or similar sections, because of flow of short fibers into such sections, the high melt viscosity of the resin-filler-short fiber mixture aids in promoting uniformity of properties by forcing a significant amount of glass mat into the above mentioned ribs, bosses, etc. Furthermore, because of the generally enhanced moldability of the present compositions, longer, thinner and more complex configurations or parts can be molded than heretofore known.

The short fibers oriented parallel to the plane of the sheet (in distinction to perpendicular to the plane of the sheet results in a smooth surface free of glass mat and projecting fiber ends. Optionally a relatively fine fiber mat comprising one to five glass fibers per strand, compared to the coarse mat comprising in the order of 40–100 or more fibers per strand, may be used as a veil to aid in confining the coarse central mat by sandwiching the coarse mat between two veils. Also a single veil may be used on that face of the sheet in which the objective of lens penetration of coarse fiber is desired.

Figure 2:
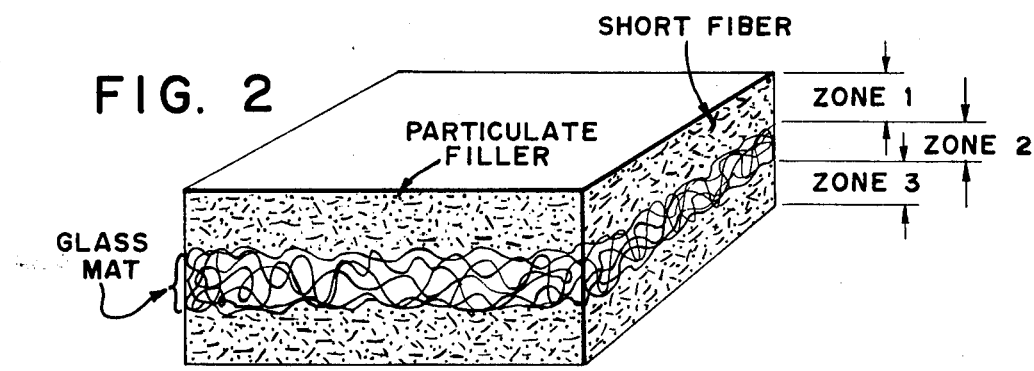
FIG. 2 illustrates the individual sections of FIG. 1 bonded together adhesively or mechanically, in a continuous or non-continuous process, into a unified, sheet structure in which a barrier against glass mat exposed on either sheet surface is effectively present, preventing glass mat show-through to the exterior surfaces.

In one preferred variation of the above proposed composition, the glass mat, is located centrally in the cross section of the final composition (zone 2 in FIG. 2). Zones 1 and 3 in FIG. 2 are comprised of thermoplastic resin and particulate filler and short fiber reinforcement. The resin phase (i.e., the primary material of zone 1 and zone 3) is also present to a considerable extent in zone 2 in order to cohesively bind the three-layer composition into one integral sheet unit. The thickness of each section or zone of FIG. 2 is not important, as long as the glass mat (zone 2) is kept predominantly away from the exterior or use surface of the sheet composition. In FIG. 2, zone 1, 2 and 3 are of approximately the same thickness.

Figure 3:
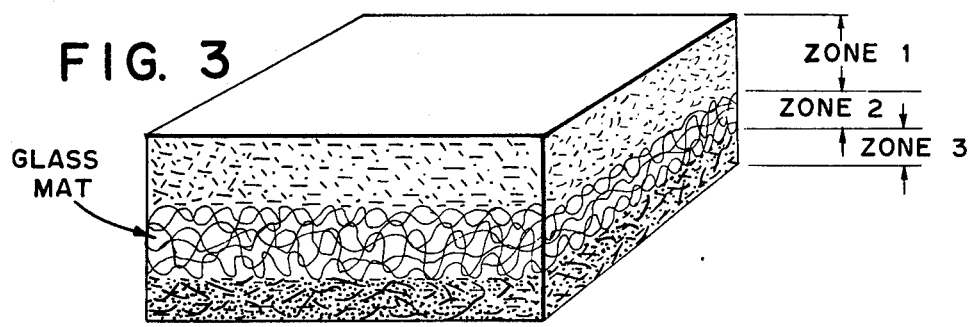
FIG. 3 illustrates an alternate laminated composite sheet in which the top layer, which may be the exposed surface layer of the formed article, is not identical to the bottom layer in thickness and/or concentration of constituents.

FIG. 3 illustrates a similar composition, except that the 3 zones are not symmetrical with respect to the sheet center, and the predominantly glass mat phase (zone 2) is located closer to the face of the sheet near zone 3 than to zone 2. Such a composite sheet construction would probably result in one surface (i.e., that of zone 2) being of smoother quality than the surface of zone 3, because the proximity of the glass fiber mat to the zone 3 surface is detrimental to that surface.

In a modification of the sheet construction presented in FIG. 3, a two-zone construction may be utilized in which zone 3 of FIG. 3 is entirely eliminated. FIG. 4 presents such a construction. Thus, a sheet of such a construction would definitely have only one smooth, appearance quality surface (zone 1) while the other surface (zone 2) would have glass mat fiber bundles near or at the sheet surface.

The constructions illustrated in FIGS. 1–4 are meant to show the short fibers oriented in a random manner or essentially in the plane of the sheet, with very few fiber ends projecting out of (in a perpendicular or near-perpendicular manner) the sheet surface.

The composite sheet constructions illustrated by FIGS. 2 and 3 are meant to be used as illustrative examples only, and are not to be taken as limiting the scope of the present invention.

The present invention is more particularly described in the following Examples which are intended as illustrative only since numerous modifications and variations therein will be apparent to those skilled in the art.

EXAMPLE 1

A mixture of 38.9% by weight nylon-6 polymer pellets, 38.9% by weight kaolin filler of mean particle size 10 microns ($\mu$) and 22.2% short glass fibers of length ⅛ inch were blended for 3 minutes in a Henschel mixer. Two hundred lbs. of this blend were fed to a 2½ inch Prodex vented extruder and extruded into sheet material 0.046 inch thick and 3 ft. wide. Microscopic examination revealed that the majority of the short fibers were aligned randomly essentially in the plane of the extruded sheet, with little or no fiber ends projecting out of the plane of the sheet.

One square foot layers of this material were placed on either side of a continuous random glass mat material weighing approximately 1.5 ounces/ft$^2$. The glass mat consisted of strands containing approximately 40 filaments/strands, each individual filament being of 0.0004 inch in diameter.

The tri-layer laminate of the polymer mixture/glass mat/polymer mixture was compression molded between the platens of a compression molding press at a pressure of 100 psi and at a platen temperature of 270° C. The resultant unified sheet did not show any glass fiber mat exposed at the surface. The specific gravity of the final sheet was approximately 1.75 g/cc, the final thickness was approximately 0.10 inch and the final composition of the composite sheet was:

35.5% nylon-6
35.5% kaolin
20.2% short fiber reinforcement
8.8% glass mat reinforcement Several such sheets were pre-heated to approximately 270° C. in an infrared oven, and stamped into shaped cups. Shaping of the sheet was accomplished in a deep drawing press which has a polished steel die-set to produce 5 inch diameter cylindrical cups. The temperature of the polished steel die-set was adjusted by means of electric heaters, and was maintained at approximately 140° C. In this and all following examples, the steel molds used were highly polished and chrome-plated (mirror-finished).

The pre-heated sheet was transferred to the stamping press, and stamped at a pressure of 800 psi maintained for 10 seconds. The stamped part was cooled to room temperature, maintained at room temperature for 24 hours, and the flat bottom of the cup was then cut out for surface roughness testing.

A Bendix micro-corder Profilometer was used to measure the roughness profile of the stamped section of the cup. A stylus of radius 0.0005 inch was used, and a cut-off length of 0.030 inch was set. All surface measurements described herein were performed in accordance with "American Standard ASA B46.1—1962, Surface Texture", copies of which may be obtained from the American Society of Mechanical Engineers.

Figure 6:
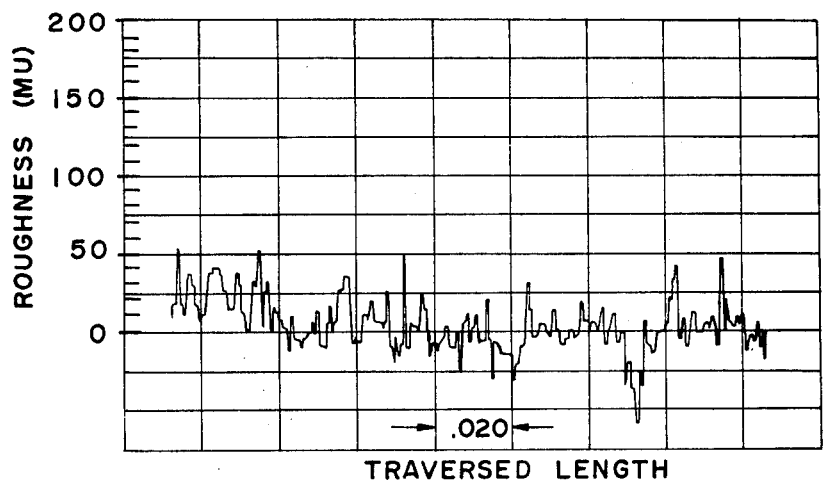
FIGS. 6, 7 and 8 are profilometer or proficorder graphs of the surface profile showing the roughness height versus the traversed length of the recording instrument obtained according to ASA B46.1—1962.

A replica of the surface profile tracing obtained is reproduced in FIG. 6. It can be seen that the maximum roughness height peak is no more than 55 microinches (MU) above or below the center-line, and an extremely smooth surface is obtained. It can be mentioned here that the arithmetic average (A.A.) roughness height of a smooth cold-rolled steel surface is 50-300 MU, although a surface of A.A. roughness height 50-250 MU is most desirable for most exterior, appearance type of applications.

EXAMPLE 2 (Comparative)

For purposes of comparison, a sheet composition similar to the one described in Example 1 was constructed, except that all of the short fibers were replaced by the glass mat reinforcement. The final sheet composition was therefore:
  35.5% nylon-6
  35.5% kaolin
  29.0% Glass mat The thickness, specific gravity, and sheet molding and stamping conditions were identical to those described in Example 2, except that no short, well dispersed glass fibers are present. The glass mat could be seen by visual inspection to be extremely close to the sheet surface both before and after stamping into the cylindrical, flat bottomed cup.

Figure 7:
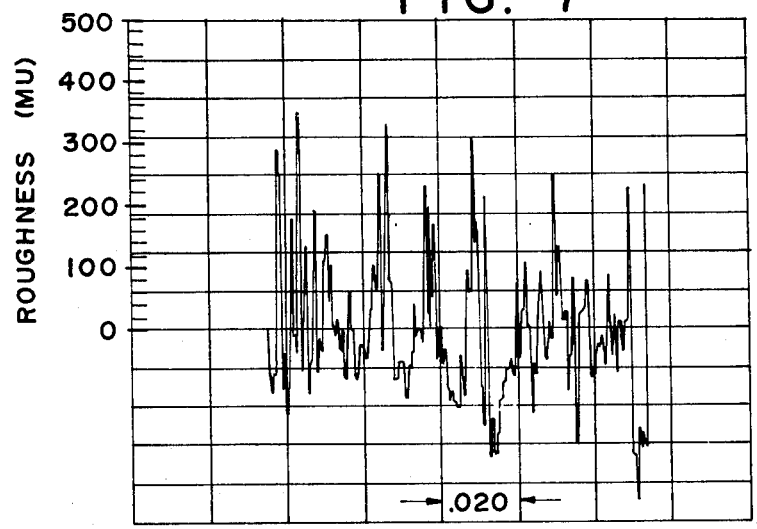

A surface tracing of the roughness profile is presented in FIG. 7. It is seen that a multitude of peaks are over 300 MU in height. Even more extreme peak heights, over 1000 MU in height, were also encountered in several areas of the stamped part, but are not shown here since they literally went off the graph.

EXAMPLE 3

The procedure of Example 1 was repeated, except that the polymer was polyethylene terephthalate (PET) and the particulate filler was novaculite (quartz) of mean particle size 5 microns. The molding and pre-heating temperatures were increased slightly, since PET has a melting point of 260°-265° C., while nylon-6 has a melting point of 220°-225° C.

Composite sheets containing polymer, filler, short fiber, and mat were laminated into a composition similar to that of Example 1. The sheets were pre-heated to 280° C., and stamped between the dies kept at 150° C. The surface roughness was measured as previously, and the arithmetic average roughness height determined to be 65 MU. Microscopic examination again revealed that the angle between the short, well dispersed fibers and the plane of the sheet was usually less than 40° and often less than 20°, indicating a high degree of randomness in or largely parallel to the plane of the sheet.

EXAMPLE 4

The procedure of Example 1 was repeated except that the matrix polymer was polypropylene, and the filler was talc. Compositions were altered so that the final composite sheet consisted of:
  38% polypropylene
  34% talc
  21% short glass fiber
  7% glass mat In the manufacture of this sheet, a mixture of
  40.9% by weight polypropylene
  36.6% talc
  22.5% ¼ inch short fibers were extruded in a 2½ feet extruder sheets. During cooling of the extruded sheet between a three-roll calendar, the glass mat was placed onto the hot, molten polymer-filler-fiber mixture. In passing through the calendaring stack, the glass mat was impregnated with the polymer mixture. The final thickness of this composite sheet was 0.060 inch, and only one surface was free of the glass mat reinforcement.

The sheet was pre-heated to 220° C. and stamped in a manner as described in Example 1, except that the mold was kept at 80° C.

The surface roughness of a stamped polypropylene sheet section was measured with the Bendix microcoder. Since each side of the original polypropylene sheet was of a different texture (i.e., one side was mat-free, and one side was clearly mat-predominant), the surface roughness of each side was measured. The A.A. roughness height of the mat free surface was 40 MU, while the A.A. roughness height of the mat-predominant surface was in excess of 2300 MU. Microscopic examination of the sheet surface revealed many short fibers lying in the plane of the sheet at its surface, but very few (less than 10-20%) fibers protruding at a near-perpendicular angle out of the surface.

EXAMPLE 5

Figure 8:
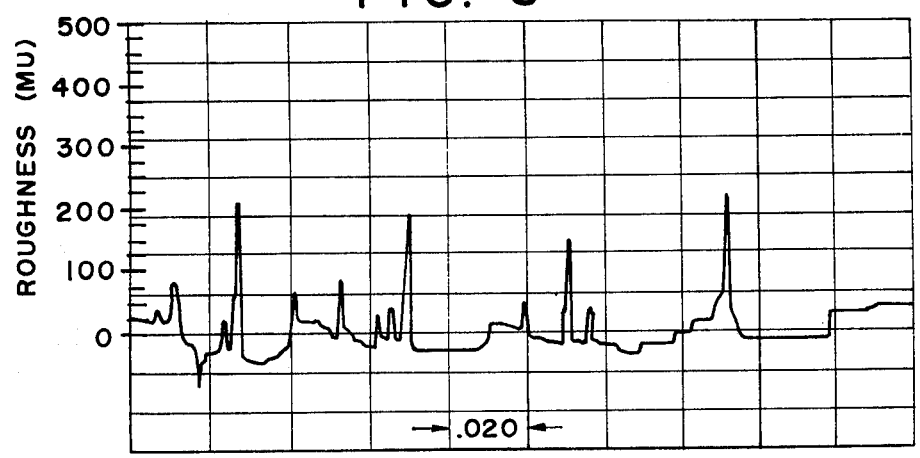

The procedure of Example 2 was repeated except that the short fibers were omitted from the original extruded sheet mixture. A three-ply construction was then laminated in a compression press to yield a single, unified sheet. The construction of the sheet was as follows:
  polymer-filler/glass mat/polymer-filler The composition of the final composite sheet was as follows:
  46% nylon-6
  45% Kaolin
  9% glass mat The sheet was stamped as described in Example 1, and the surface roughness measured. FIG. 8 presents a plot of the recorded profile. It is seen that roughness peaks in excess of 200 MU are evident, while in Example 2, with short fibers present in the surface layers, a roughness height of only 55 MU was observed. Clearly, the presence of the short, well dispersed, randomly planar glass fibers aids in preventing show-through of the glass mat.

EXAMPLE 6

Mechanical properties were measured upon the specimens of Example 1, (sheets containing short well dispersed fibers), and of Example 5, (sheets not containing short fibers). The results are presented in Table I.

TABLE I

|  | Ex. 1 | Ex. 5 |
|---|---|---|
| Tensile Str., psi | 12,500 | 12,000 |
| Flexural Str., psi | 22,000 | 17,000 |
| Flexural Modulus, psi × 10$^{-6}$ | 1.5 | 0.43 |
| Notched Izod Impact Str., ft/lb/in notch | 6.0 | 1.6 |

It is clearly seen that the addition of short fiber reinforcement results in improved properties. The impact strength and flexural modulus are increased significantly when short reinforcing fibers are utilized.

EXAMPLE 7 (Comparative)

A mixture of nylon 6, kaolin filler, and short fiber reinforcement was extruded and pelletized into ⅛ inch × ⅛ inch pellets. The composition of this mixture was:
- 39% nylon-6
- 39% kaolin
- 22% short glass fibers The pelletized mixture was uniformly distributed and compression molded in a polished steel mold into a 4 inch diameter plaque ¼ inch deep. The surface texture of this plaque was measured as explained previously, and a maximum roughness height of 40 MU was observed. This degree of roughness can be compared to that measured in Example 1, in which a similar composition was laminated onto either side of a glass mat reinforcing layer. It can be concluded that while the glass mat increases the roughness slightly, (55 MU vs 40 MU), the presence of the particulate filled and short fiber reinforced surface layer nevertheless results in an extremely smooth surface.

EXAMPLE 8

TABLE II

| Sample No. | Example No. | Composition | Flow Rate (gms/10 min.) |
|---|---|---|---|
| A | 1 | 38.9-38.9-22.2 Nylon-6-kaolin-short fibers | 5.0 |
| B | 2 | 50-50 Nylon-6-kaolin | 7.8 |
| C | — | Nylon-6-short fibers |  |
| D | — | Nylon-6 | 28.6 |

This example quantitatively demonstrates the increased viscosity of resin mistures to which particulate filler and short fibers have been added. The relative melt viscosities of resin mixtures are herein measured indirectly (i.e., in terms of flow rate rather than true melt viscosity) according to ASTM Test No. D1238 (condition S), which measures the flow rate of nylon-6 mixtures through an orifice at a temperature of 235° C and under a load of 5000 grams. The principle is identical to that of the well known "melt index" measurement, in that a high flow rate (or melt index) is analogous to a low resistance to flow and hence to a low melt viscosity. Such a technique is well known to those skilled in the art.

Referring to Table II, Sample No. A is the resin mixture of Example 1, while Sample No. B is the resin mixture of Example 2, as described in the Table. Sample No. C is a comparative mixture of 20% short fiber reinforced nylon-6, while Sample No. D is a comparative, pure nylon-6, base resin. As is indicated in the final column of Table II, the flow rate of pure nylon (D) is 28.6. The addition of 20% short fibers (C) reduces the flow rate to 9.5, indicating a markedly increased melt viscosity relative to that of the base resin. The addition of 50% by weight of kaolin (see Example 2) to nylon-6 results in a mixture having a flow rate of 7.8, indicating a melt viscosity higher than that of Samples C and D. The addition of both kaolin and short fibers results in a mixture having an extremely low flow rate (5.0), and hence an extremely high melt viscosity.

The following example illustrates the significance of the increased melt viscosity of the mixture of the present invention.

EXAMPLE 9

FIGS. 5a and 5b are schematic illustrations of cross-sections of a narrow protrusion, as may be encountered in complex shapes, ribbed sections, etc. FIG. 5a illustrates a stampable reinforced thermoplastic composition (i.e., reinforced only with long or continuous fiber mat), while FIG. 5b illustrates compositions of the present inventions (i.e., reinforced with a small percentage of fiber mat and also with short glass fibers and particulate filler).

In FIG. 5a, several undesirable features of compositions in which long glass fiber or glass mat only are used is illustrated. During stamping of the initial flat blank into a complex shape, glass fiber-thermoplastic resin separation occurs at narrow apertures, corners, edges, etc. Actual bridging of the glass mat is clearly ilustrated as it occurs in FIG. 5a. Such internal structural occurrences can be clearly demonstrated by cutting sections through actual formed parts. The vertical protrusion, which due to bridging is relatively free of glass mat reinforcement, consequentially possesses a relatively smooth surface. However, the lack of reinforcement results in non-uniform and partially weak structures. Furthermore, the height of projecting sections which can be stamped is limited, since in an initial blank consisting of 40% mat reinforcement, only 60% of the weight of the blank is the relatively mobile resinous phase.

FIG. 5b illustrates schematically the improvements achieved with present compositions. It is noticed that the flat area and the vertical projection both possess improved, smooth surfaces because of the absence of glass mat contiguous to the surface. Also, product uniformity is increased and bridging is decreased because of several factors. The presence of short fibers in the "resin phase" (i.e., the resin-filler-short fiber mixture) results in a protrusion which is reinforced with glass fibers to a large extent. Furthermore, the increased melt viscosity of the resin phase forces glass mat into the mold cavity during stamping, resulting in significantly reduced bridging.

It can thus be seen why the length of short fibers must be limited to ¾ inch or preferably less, since bridging will increase as the length of the short fiber reinforcement increases. As shown in FIG. 5a, on the other hand, the lower melt viscosity of the unfilled resin does not result in any substantial forced flow of the glass mat into the mold cavity.

It is also shown in FIG. 5b that the height of the protrusion achievable with compositions of this present invention is greater than that achievable in prior-art compositions. This is due to the fact that in the improved compositions, only 15% or less of the composition is the relatively immobile glass mat, leaving at least 85% of the more mobile resin-phase available for flow into corners, ribs, bosses, etc. In prior art compositions, reinforced with up to 50% by weight of glass mat, only 50% of the weight of the initial blank would be available for flow into similar sections, hence resulting in decreased flow and formability.

Having described the general nature and specific embodiments of the present invention, the following is claimed:

1. A smooth surfaced thermoplastic composite sheet having an average surface roughness height under 500 microinches comprising, in percent by weight of the total composite,
   a. from about 25 to 65% of a synthetic thermoplastic resin,
   b. from about 25 to 40% of a particulate filler,
   c. from about 15 to 45% of short glass reinforcing fibers having a length of not greater than about 0.85 inch, at least 50% of said fibers being aligned substantially parallel to the plane of the sheet, and
   d. from about 2% to 10% of long glass fibers having a length of about 1½ inches to continuous and being substantially below the exterior surface of the composite sheet.

2. The composite of claim 1 including about 30 to 50% of said thermoplastic resin and about 20 to 30% of said short fibers.

3. The composite of claim 2 wherein said resin is a polyamide.

4. The composite of claim 3 wherein said polyamide is nylon 6.

5. The composite of claim 2 wherein said resin is polybutylene terephthalate.

6. The composite of claim 2 wherein a layer of said long glass fibers is bonded between two surface layers comprising said other components.

7. A process for producing a smooth surfaced thermoplastic composite sheet formable into smooth, shaped objects in a rapid stamping process in a cool mold when preheated outside of the mold, which process comprises:
   a. forming a surface layer comprising, by weight based upon the total weight of the composite, from about 25 to 65% of a synthetic thermoplastic resin, from about 25 to 40% of a particulate filler, and from about 15 to 45% of short glass fiber reinforcement having a fiber length of not greater than about 0.85 inch, said fibers being aligned substantially parallel to the plane of said layer, and
   b. adhering thereto, with said thermoplastic resin as a binder, under heat and pressure a substrate comprising a glass mat formed of fiber lengths of at least 1.5 inches in length, said mat being present in said composite in an amount of about 2 to 10% by weight of the total composite and said glass fibers being substantially below the exterior surface of said composite sheet.

8. The process of claim 7 wherein said substrate sheet (b) is sandwiched between a pair of surface sheets (a).

9. A process for making shaped articles comprising forming a composite sheet in accordance with claim 7, introducing said sheet in a heated condition into a shaping apparatus and stamping said sheet into a shaped object.

10. In a method of forming shaped articles having intricate protrusions and recesses from a thermoplastic stampable sheet containing long glass fiber reinforcement, the improvement to prevent bridging of the glass fiber reinforcement and to enhance the formation of said protrusions and recesses comprising combining with about 2 to 10% by weight of the long glass fiber reinforcement, which has a fiber length in excess of 1.5 inches and about 25 to 65% by weight of the thermoplastic resin, from about 15 to 45% of a relatively short glass fiber reinforcement wherein said short glass fiber has a length not in excess of 0.85 inch, said short glass fiber reinforcement functioning to substantially force said long glass fiber into said protrusions and recesses during the forming steps, said short fibers being substantially parallel to the plane of the sheet, and from about 25 to 40% by weight of an inert, finely comminuted particulate filler, said long glass fibers being substantially below the exterior surface of said sheet.

* * * * *